March 17, 1925.
G. E. RUCKSTELL
1,530,205
CUSHIONED CHANGE SPEED AXLE
Filed Aug. 8, 1924
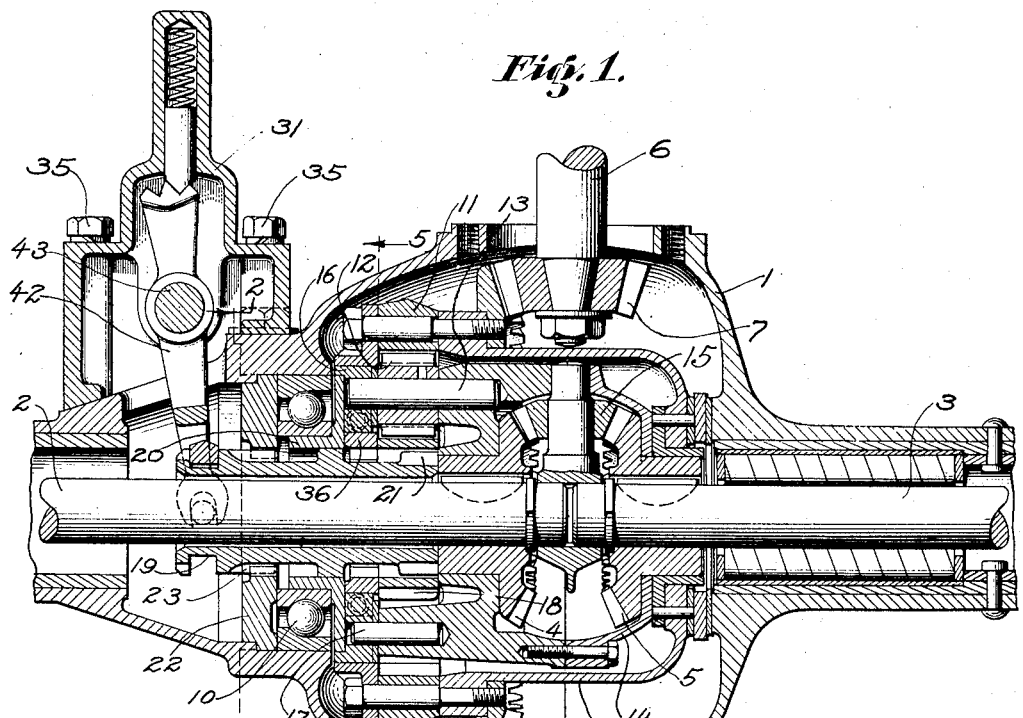
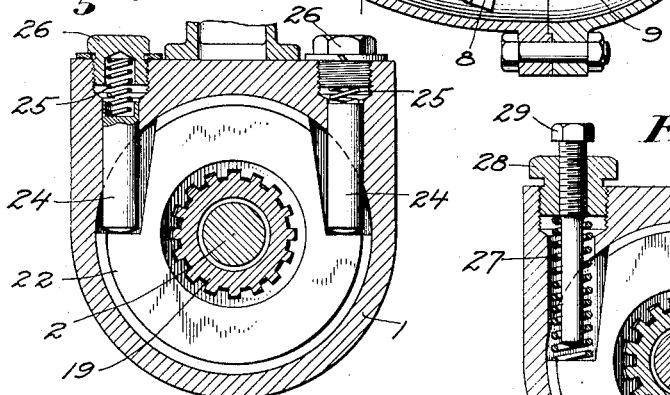
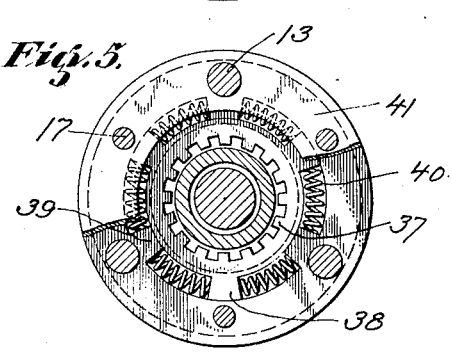
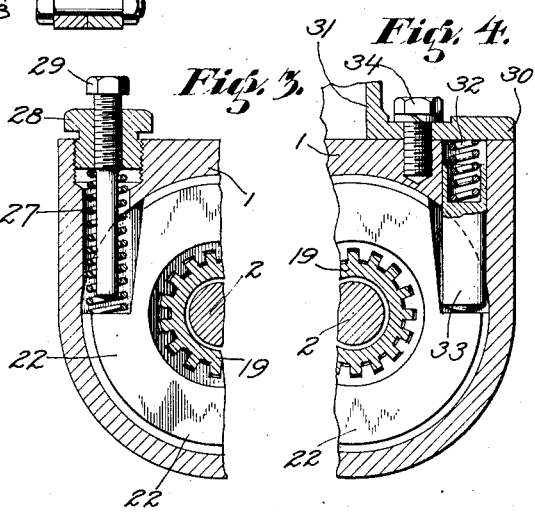
Inventor
Glover E. Ruckstell.
By Dewey Strong Townsend and Loftus
Attorneys.

Patented Mar. 17, 1925.

1,530,205

UNITED STATES PATENT OFFICE.

GLOVER E. RUCKSTELL, OF BERKELEY, CALIFORNIA.

CUSHIONED CHANGE-SPEED AXLE.

Application filed August 8, 1924. Serial No. 730,974.

*To all whom it may concern:*

Be it known that I, GLOVER E. RUCKSTELL, citizen of the United States, residing at Berkeley, county of Alameda, and State of California, have invented new and useful Improvements in Cushioned Change-Speed Axles, of which the following is a specification.

This invention relates to transmission mechanisms for motor driven vehicles, and more particularly to such mechanisms in combination with the differential gear system ordinarily employed on the rear axles of automobiles. The primary function of mechanisms of this type is to provide a further variation of speeds to the rear axles, such a variation being particularly desirable in the so-called two speed automobiles, as the Ford. My present invention relates particularly to a combined change speed planetary and differential gear system, and the primary object of the invention is to provide a novel shock absorbing means in such system for preventing shock to the parts thereof when shifting from one speed to another.

In a copending application, Ser. No. 545,936, filed March 23, 1922, is disclosed a combined change speed planetary and differential gear system for automobiles in which shiftable means is provided for optionally locking the planetary gear system to rotate as a unit for direct drive or locking the sun gear thereof to a fixed element, and thereby causing the planetary system to rotate therearound to produce a reduced speed drive. Another object of my invention is to provide resilient shock absorbing means in conjunction with the planetary gear system and the said fixed element for preventing shock to the parts thereof when shifting from one speed to another.

With the above and other objects in view, my invention consists in the features of construction and operation set forth in the following specification and illustrated in the accompanying drawing. In such drawing annexed hereto and forming a part of this specification, I have shown certain specific embodiments of my invention, but it will be understood that the invention can be otherwise embodied, and that the drawing is not to be construed as defining or limiting the scope of the invention, the claims appended to this specification being relied upon for that purpose.

Referring to the figures of the drawing:

Fig. 1 is a horizontal sectional view through the differential housing of the rear axle of a motor vehicle.

Fig. 2 is a cross section therethrough on line 2—2 of Fig. 1.

Figs. 3 and 4 are fragmentary views showing modifications of Fig. 1.

Fig. 5 is a cross sectional view taken on line 5—5 of Fig. 1.

Referring more specifically to the drawing by reference characters, 1 indicates the differential housing of the rear axle of a motor vehicle, and 2 and 3 indicate respectively the two axle shafts which are secured to the rear wheels of the vehicle. Bevel gears 4 and 5 of the differential gear system are respectively secured to the inner ends of the axle shafts 2 and 3.

The main driving shaft 6 extends rearwardly of the automobile and has a bevel pinion 7 on its rear end in mesh with a bevel gear 8 secured to the casing 9 of the differential mechanism. This casing is rotatably supported at one end on the hub of the bevel gear 5 and at its other end within a bearing 10. A ring gear 11 secured to the casing 9 is in mesh with a plurality of pinions 12 of the planetary gear system, the pinions 12 being rotatably supported on axles 13.

The spider 14 of the differential mechanism carries a plurality of bevel pinions 15 in mesh with the bevel gears 4 and 5. The spider also supports the inner ends of the pinion axles 13, the outer ends thereof being supported by an element 16 within the casing 9, and dowelled to the spider by pins 17.

The sun gear 18 of the planetary gear system is in mesh with the pinions 12. An axially slidable sleeve 19 supported within an element 20 over the axle 2 has teeth 21 on its inner end in mesh with teeth formed on the inner bore of the sun gear, the sleeve and sun gear being thereby always locked against relative rotation.

A plate 22 is mounted in one end of the housing around the sleeve 19. The bore of this plate is toothed to cooperate with teeth 23 on the sleeve. As illustrated in Fig. 2, a pair of spring pressed plungers 24 engage opposite sides of the plate and normally hold the same in a fixed rotative position. The springs 25, however, permit a limited resilient rotation of the plate in either direction for the purpose hereinafter described. The amount of such rotation and the resistance offered by the springs can be adjusted by rotating the threaded bushings 26.

In Fig. 3 is illustrated a modified form of the plate holding means. In this construction, the compression of the spring 27 can be varied by rotating the bushing 28, and the rotative movement allowed the plate 22 can be varied by rotating the threaded pin 29.

A further and non-adjustable modified form of the plate holding means is shown in Fig. 4. In this construction a portion 30 of the housing 31 covers the plunger bore in the housing 1. A spring 32 engages the housing 30 at one end and the plunger 33 at its other end. The housing is held in place by tap bolts 34 and 35.

Within the element 16 is an element 36 surrounding the sleeve 19. The bore of this element is provided with teeth 37 to cooperate with the teeth 21 on the sleeve. Three radially projecting lugs 38 formed on the periphery of the element 36 are each positioned respectively between two or three inwardly projecting lugs 39 on the element 16. A plurality of compression springs 40 are mounted in the recesses thus formed between these lugs, each spring being in engagement with a lug 38 at one end and a lug 39 at its other end. A cover plate 41 holds the springs in place. The elements 16 and 36 are normally in the relative position illustrated in Fig. 5, but it will be understood that a slight relative rotative shock absorbing movement of these elements is permitted by the springs, as hereinafter described.

In the position of the sleeve 19 as illustrated in Fig. 1, the plate 22 locks the sleeve against rotation whereby the sun gear 18 is also locked against rotation. The sleeve can be shifted outwardly by means of a yoke 42 pivoted to the housing 31 at 43. In the outer position of the sleeve, the teeth 23 are disengaged from the plate 22, and the teeth 21 engage with the teeth on the element 36, such teeth 21 being also in engagement with the teeth of the sun gear 18. In such position of the sleeve, the sun gear and element 36 are locked against relative rotation.

The operation of my improved mechanism is as follows: With the parts in the relative positions illustratd in Fig. 1, the sun gear 18 is held against rotation, and the drive from the shaft 6 to the axles 2 and 3 will be at a reduced speed, the pinions 12 rotating on their axles around the sun gear. When shifting the sleeve 19 outwardly and engaging its teeth 21 with the teeth 37, the springs 40 are adapted to compress sufficiently to prevent shock to the driving parts thereof. In such position, the ring gear 11, pinions 12, sun gear 18, sleeve 19, and element 36 are all locked together as a unit, and the drive from the shaft 6 to the axles 2 and 3 will be at direct speed through the ring gear 11 and spider 14. When shifting the sleeve inwardly to the position illustrated in Fig. 1 wherein the teeth 23 thereof engage the teeth on the plate 22, the resilient mounting of the plate as shown in Figs. 2, 3 and 4, permits the plate to rotate slightly in either direction sufficiently to prevent shock to the driving parts. It is believed that the invention and its advantages will now be understod without further description thereof.

Having thus described my invention, what I claim and desire to secure by Letters Patent is:

1. In a combined change speed planetary and differential gear system, the combination of an inner gear, a ring gear, a plurality of intermediate pinions journalled on the differential spider and in mesh with both gears, a normally fixed element, shiftable means for optionally locking the inner gear to the ring gear for direct drive through the said system or to the fixed element for reduced drive through the said system, and resilient shock absorbing means for preventing shock to the parts when shifting the first said means from one drive to the other.

2. In a combined change speed planetary and differential gear system, the combination of an inner gear, a ring gear, a plurality of intermediate pinions journalled on the differential spider and in mesh with both gears, a normally fixed element, a sleeve connected to and coaxial with the inner gear, the sleeve being adapted in one axial position to lock the inner gear to the ring gear for direct drive through the said system, and in another axial position thereof to lock the inner gear to the normally fixed element for reduced drive through the said system, and resilient shock absorbing means for preventing shock to the parts when shifting the sleeve axially from one position to the other.

3. In a combined change speed planetary and differential gear system, the combination of an inner gear, a ring gear, a plurality of intermediate pinions journalled on the differential spider and in mesh with both gears, a normally fixed element, shiftable means for optionally locking the inner gear to the ring gear for direct drive through the said system or to the fixed element for reduced drive through the said system, and resilient shock absorbing means, including a plurality of compression springs arranged coaxially around the inner gear and between the differential mechanism and a part engaged by the inner gear, for preventing shock to the parts when shifting the first said means from one drive to the other.

4. In a combined change speed planetary and differential gear system, the combination of an inner gear, a ring gear, a plurality of intermediate pinions journalled on the differential spider and in mesh with both gears, a normally fixed element, shiftable means for optionally locking the inner gear to the ring gear for direct drive through the said system or to the fixed element for reduced drive through the said system, and means for permitting a slight shock absorbing movement of the said normally fixed element when shifting the first said means from one drive to the other.

5. In a combined change speed planetary and differential gear system, the combination of an inner gear, a ring gear, a plurality of intermediate pinions journalled on the differential spider and in mesh with both gears, a normally fixed element, shiftable means for optionally locking the inner gear to the ring gear for direct drive through the said system or to the fixed element for reduced drive through the said system, and resilient means for permitting a slight shock absorbing rotation of the said normally fixed element in either of two directions when shifting the first said means from one drive to the other.

6. In a combined change speed planetary and differential gear system, the combination of an inner gear, a ring gear, a plurality of intermediate pinions journalled on the differential spider and in mesh with both gears, a plate, shiftable means for optionally locking the inner gear to the ring gear for direct drive through the said system, or to the said plate for reduced drive through the said system, and a pair of resilient means respectively engaging opposite sides of the said plate and normally holding the plate in a fixed rotative position but resiliently permitting a slight rotation thereof in either direction to take up shock when shifting the said shiftable means.

GLOVER E. RUCKSTELL.